Dec. 2, 1924. 1,518,106

C. D. RAFFERTY

WHISTLE OPERATING VALVE

Filed Sept. 20, 1923

Inventor
C. D. Rafferty.
By
Attorney

Patented Dec. 2, 1924.

1,518,106

UNITED STATES PATENT OFFICE.

CHARLES D. RAFFERTY, OF SAULT STE. MARIE, ONTARIO, CANADA.

WHISTLE-OPERATING VALVE.

Application filed September 20, 1923. Serial No. 663,849.

*To all whom it may concern:*

Be it known that I, CHARLES D. RAFFERTY, a citizen of the United States, residing at Sault Ste. Marie, in the Province of Ontario, and Dominion of Canada, have invented certain new and useful Improvements in Whistle-Operating Valves; and I do hereby declare the following to be a full, clear, and exact description of the invention, such as will enable others skilled in the art to which it appertains to make and use the same.

The invention relates to a fluid controlling valve and has for its object to provide a device of the nature aforesaid for supplying pressure to a part to be operated and for relieving said part of the pressure when it is desired to have the same assume a normal position.

A further purpose of the invention is to provide a valve for controlling fluid pressure to a valve mechanism for actuating a steam whistle, thereby obviating the necessity of the usual whistle rigging and replacing the same by a pipe of small diameter.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Figure 1:
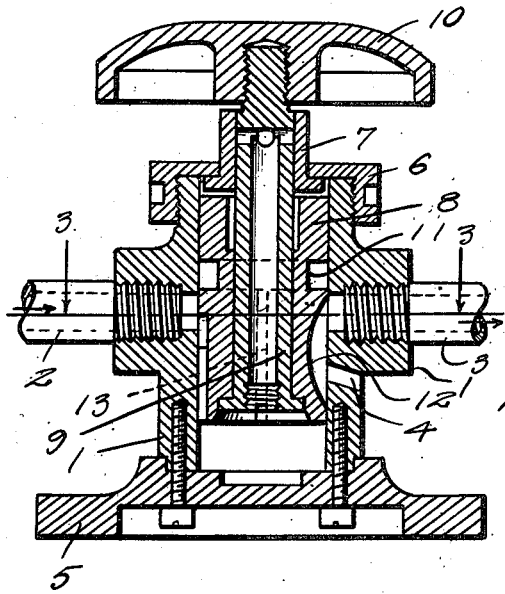
Figure 2:
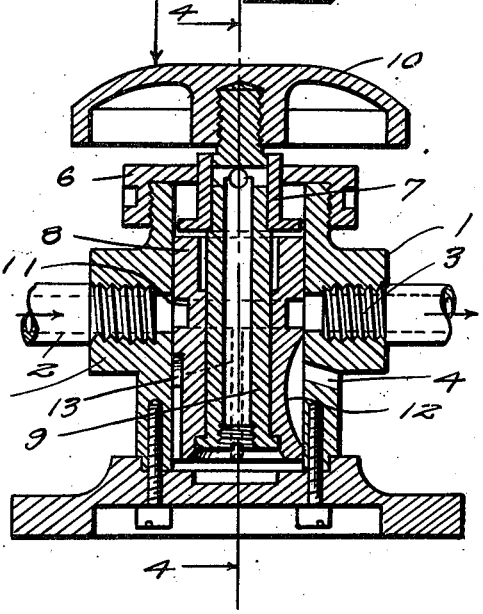
Figure 4:
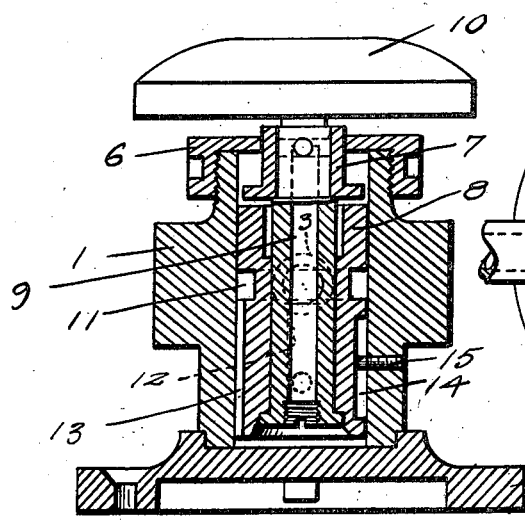
Figure 3:
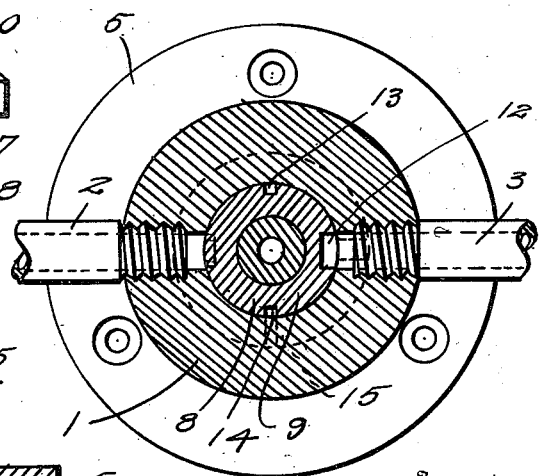

Referring to the accompanying drawings forming a part of the application:

Figure 1 is a vertical sectional view of an automatic whistle operating valve embodying the invention with the valve in closed position, Figure 2 is a similar view with the valve in open position, Figure 3 is a horizontal section on the line 3—3 of Figure 1, and Figure 4 is a vertical section on the line 4—4 of Figure 2.

Corresponding and like parts are referred to in the following description and designated in the several views of the drawings by like reference characters.

The numeral 1 designates the valve body which is hollow and provided at opposite sides with coupling ends for connection therewith of pipes 2 and 3. The pipe 2 connects with a source of fluid supply such as steam or compressed air. The pipe 3 connects with the valve mechanism for operating the whistle. An opening 4 in the side of the body 1 adjacent the outlet receiving the pipe 3 constitutes a vent for the escape of pressure from the valve mechanism of the whistle. A base 5 closes the lower end of the valve body and may be secured thereto by means of machine screws or in any preferred way. A cap 6 is threaded to the upper end of the body and is centrally apertured to receive a bushing 7, thereby obviating the necessity of a stuffing box.

A plug valve 8 snugly fits within the body 1 and is formed with a central opening in which is fitted a stem 9, the upper end of which projects through the bushing 7 and receives a pressure head 10. The stem 9 has a swivel connection with the valve 8 and is formed with an oil duct to admit of proper lubrication. The valve 8 is formed with an annular groove or passage 11 which is adapted to register with the pressure inlet and the pressure outlet of the valve body with which the pipes 2 and 3 connect, respectively. A longitudinal passage 12 is formed in a side of the valve 8 and when the latter is closed, the passage 12 establishes communication between the vent opening 4 and the pressure outlet with which the pipe 3 connects, whereby to bleed or exhaust the pressure from the whistle operating valve. A second passage 13 is formed in a side of the valve 8 and is in communication at one end with the annular passage 11 and has its other end opening through the bottom of the valve, whereby to supply pressure to the lower portion of the body 1 below the valve 8 to normally hold the same closed when relieved of pressure applied to the head 10 for holding the valve in open position during the operation of the whistle. A longitudinal groove 14 in a side of the valve 8 receives the inner end of a screw 15 let into a side of the body 1, whereby to prevent turning of the valve and disalinement of the passages 12 and 13.

When the valve 8 is closed, pressure from the pipe 2 is supplied to the passage 13 and to the lower end of the valve, thereby normally holding the same in closed position. Upon applying pressure to the head 10 and moving the valve 8 into open position, the annular passage 11 establishes communication between the pressure inlet 2 and the pressure outlet 3, thereby operating the controlling valve mechanism of the whistle or other analogous part. When the head 10 is relieved of pressure, the valve 8 automatically closes by being moved upward in the valve body 1, thereby cutting off pressure to the outlet 3 and establishing communication betwen said outlet 3 and the opening 4, whereby to vent or bleed the part to which the pressure was supplied.

What is claimed is:

1. A fluid pressure controlling valve comprising a body having a pressure inlet and a pressure outlet, and a valve within the body having a passage to establish communication between the pressure inlet and the pressure outlet and having a second passage leading from the first mentioned passage to an end of the valve to supply pressure thereto for closing the valve when the pressure exerted to hold the same in open position is removed.

2. A fluid pressure controlling valve comprising a body having an inlet and an outlet and provided with a vent, a valve in the body and having a passage to establish communication between the inlet and the outlet and having a second passage to establish communication between the outlet and the vent, and having a fluid passage leading from the first mentioned passage to an end of the valve for supplying pressure thereto for maintaining the valve in closed position.

In testimony whereof I affix my signature in presence of two witnesses.

CHARLES D. RAFFERTY.

Witnesses:
 RHEA KAUPP,
 H. J. HERROLD.